March 28, 1961     G. W. SCHATZMAN     2,977,136
FENDER SHIELD STRUCTURE
Filed Nov. 13, 1957     2 Sheets-Sheet 1
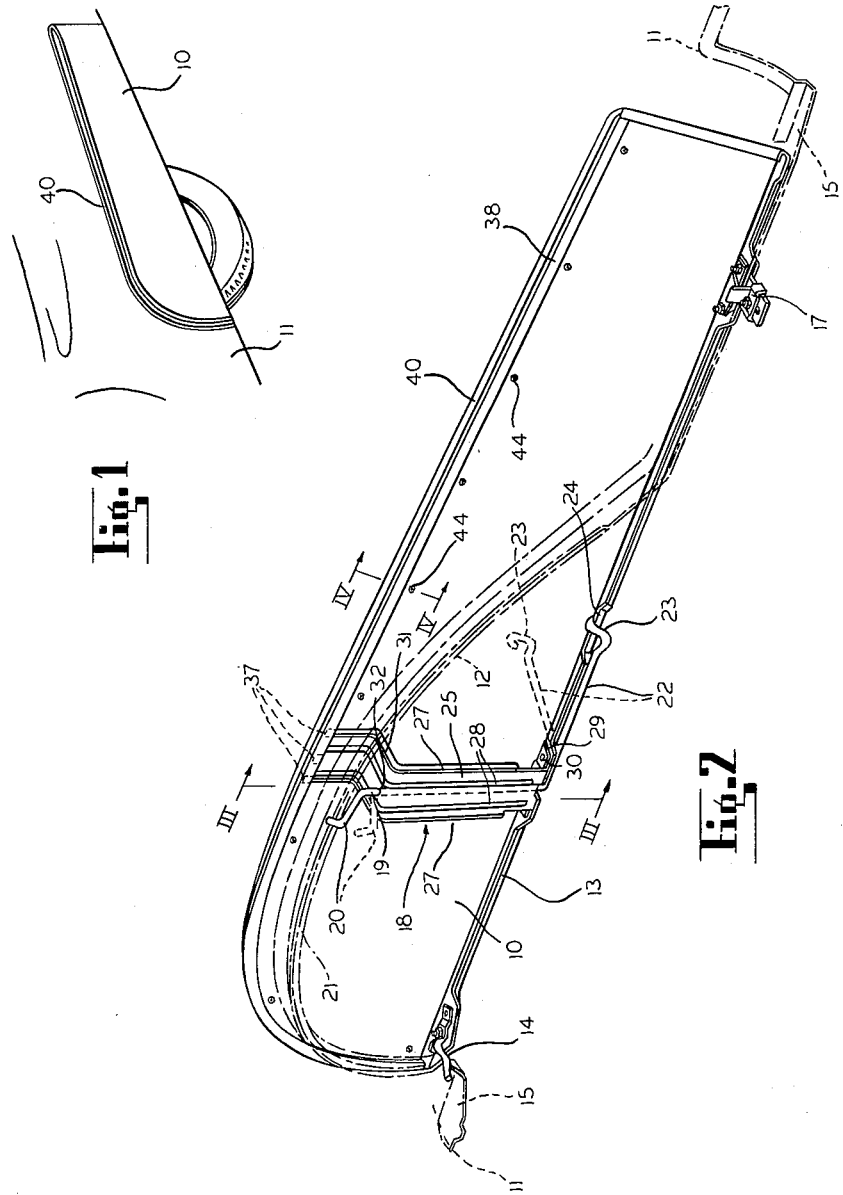
INVENTOR.
GEORGE W. SCHATZMAN
BY
ATTORNEYS March 28, 1961  G. W. SCHATZMAN  2,977,136
FENDER SHIELD STRUCTURE
Filed Nov. 13, 1957  2 Sheets-Sheet 2
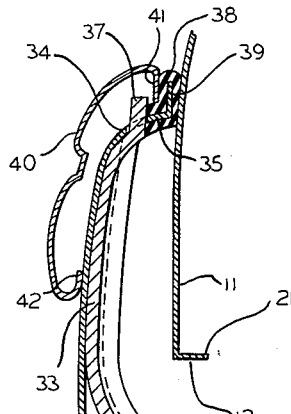
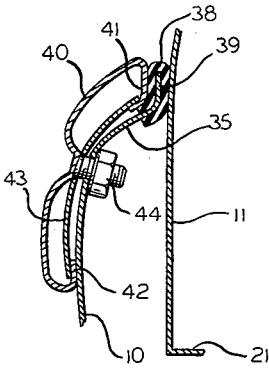
Fig. 4
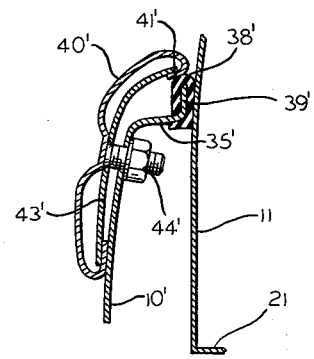
Fig. 5
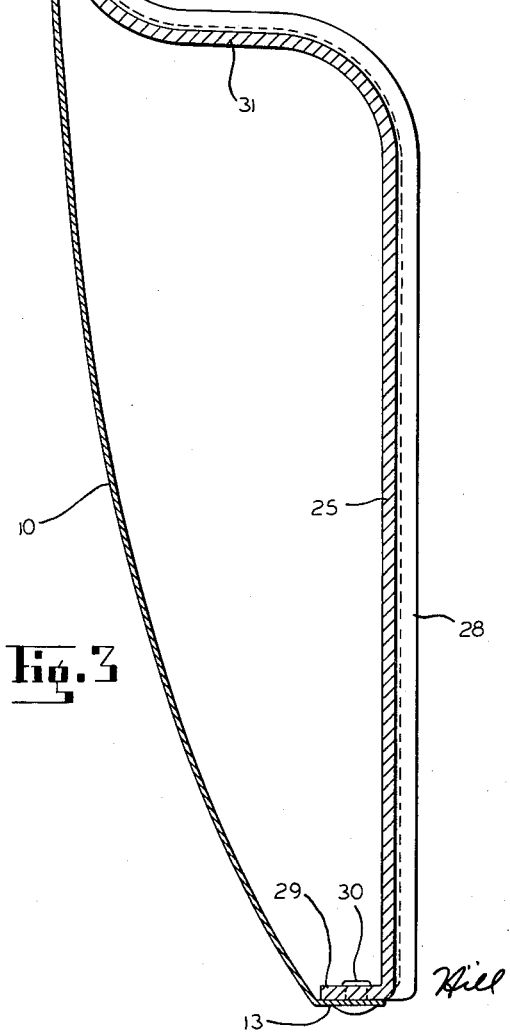
Fig. 3
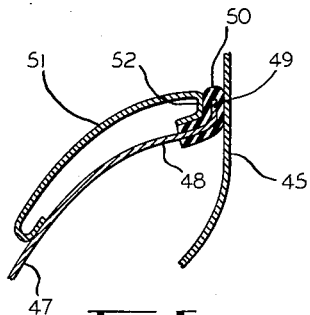
Fig. 6
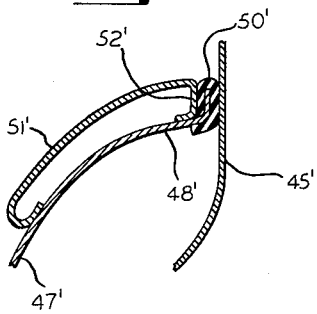
Fig. 7
INVENTOR.
GEORGE W. SCHATZMAN
BY
ATTORNEYS

United States Patent Office 2,977,136
Patented Mar. 28, 1961

2,977,136
FENDER SHIELD STRUCTURE

George W. Schatzman, Detroit, Mich., assignor to Houdaille Industries, Inc., Buffalo, N.Y., a corporation of Michigan Filed Nov. 13, 1957, Ser. No. 696,272

3 Claims. (Cl. 280—153)

The present invention relates to improvements in fender shields for disposition in closing relation to the wheel access openings in automobile fenders.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in a generally axial direction. Since the opening inherently presents a relatively unattractive outward appearance and is, at high speed operation, an air turbulence factor, detachable fender shields have been employed to cover the opening protectively and ornamentally.

As the term "fender shield," shall hereinafter be employed, it refers to a panel that is provided for the purpose of covering the opening in the feeder or vehicle body provided for access to or removal of vehicle wheels. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly from the principal body portion of the vehicle.

An important object of the present invention is to provide an improved fender shield with a novel construction for supporting a resilient gasket to provide a rattle proof and substantially fluid tight joint between the fender shield and the fender.

Another object of the invention is to provide an improved fender shield construction for overlapping disposition to the outer side of a vehicle fender.

A further object of the invention is to provide an improved fender shield construction wherein a novel relationship between an ornamental bead or strip and a sealing or gasket strip is provided.

Still another object of the invention is to provide an improved sealing arrangement between a fender shield and a fender.

Other objects, features and advantages of the present invention will be readily apparent from the following detailed description of certain preferred embodiments thereof taken in conjunction with the accompanying drawings, in which:

Figure 1 is a fragmentary perspective view of a fender and fender shield assembly;

Figure 2 is an inner side elevational view of the fender shield of Figure 1 with the fender structure shown in phantom outline;

Figure 3 is an enlarged fragmentary sectional detail view taken substantially on the line III—III of Figure 2;

Figure 4 is a fragmentary sectional view on an enlarged scale taken substantially on the line IV—IV of Figure 2;

Figure 5 is a sectional view similar to Figure 4 but showing a modification;

Figure 6 is a fragmentary sectional view showing a further modification; and

Figure 7 is a sectional view showing another modification.

In a typical assembly embodying the features of the present invention (Fig. 1), a fender shield 10 is applied to the outer side of a vehicle fender 11 in closing relation to a wheel access opening 12 (Figure 2 and 3) in the fender. In the present instance, the fender shield 10 is dimensioned to be substantially longer than the wheel access opening 12 and to overlap a substantial portion of the fender rearwardly from the wheel access opening.

Although other types of sheet material such as plastic sheet of ample rigidity may be used, currently the most economical material is sheet metal such as steel sheet from which the panel of the fender shield 10 is made, being shaped conformable to the outside shape of the overlapped portion of the fender 11 or to provide a desired external shape appearance for the covered portion of the fender. Along its lower margin, the fender shield 10 is provided with an inturned flange structure 13 carrying at the forward end of the fender shield a supporting finger 14 engageable upon an inturned lower marginal flange 15 on the fender 11 adjacent to the forward end of the wheel access opening 12. Adjacent to the rear end of the fender shield 10, the lower marginal flange 13 carries a retaining bracket structure 17 which is engageable with the lower marginal flange 15 of the fender 11 rearwardly from the wheel access opening 12. Thereby, the lower portion of the fender shield is supported upon the fender and in the preferred relation to the lower side of the wheel access opening 12.

For retaining the fender shield 10 in position against the outer side of the fender 11, cooperatively related to the lower retaining structures 14 and 17 which are so constructed and arranged as to hold the lower portion of the fender shield snugly against the fender and for this purpose may be adjustable for optimum efficiency, a latch structure 18 is provided which will coact with the fender at the upper side of the wheel access opening for drawing the upper portion of the fender shield toward and against the fender. In a preferred form, the latch mechanism 18 includes a rotary torsion latch rod 19 extending vertically along the inner side of the fender shield and provided at its upper end with an angular latching head 20 engageable retainingly with the inside of the upper margin of the fender defining the wheel access opening 12 and more particularly with an inturned reinforcing and finishing flange 21 of the feeder. The latching head 20 is adapted to be swung into and out of latching position by means of an angularly disposed handle 22 on the lower portion of the latch rod. A combination manipulating loop 23 and interlock terminal is engageable with an upstanding interlock portion 24 of the lower fender shield margin 13 for retaining the latch in the fender shield retaining, latching relation shown in full outline in Figure 2, but is releasable for swinging of the latch out of the retaining relation as shown in dash outline. For rotatably supporting the latch rod 19 and reinforcing the fender shield 10 as well as coacting with the latch rod in drawing the upper portion of the fender shield toward and into engagement with the fender, a bracket plate strut member 25 of substantial rigidity is provided. This plate member is adapted to be made from fairly heavy gauge sheet or strip stock such as steel which may be stamped into shape. The plate or panel of the bracket member 25 is of substantial width and is reinforced for stiffness by longitudinal side inwardly turned flanges 27 and spaced longitudinal intermediate reinforcing ribs 28. Along its lower extremity the bracket member 25 is provided with a foot flange 29 extending forwardly and secured to the upper side of the fender shield lower marginal flange 13 as by means of rivets 30. This foot flange 29 and the fender shield flange 13 cooperate to provide a lower bearing for the latch rod 19.

Adjacent to its upper end the latch bracket 25 is provided with a forwardly projecting angular offsetting latch rod bearing and shoulder portion 31 (Figs. 2 and 3) provided with a bearing aperture 32 through which the latch rod 19 extends rotatably and about which aperture the shoulder offset 31 provides a supporting shoulder for the latch head 20 in the released position as shown in dash outline in Figure 2.

For attachment of the upper end portion of the latch bracket 25 to the upper marginal portion of the fender shield 10, an upstanding head portion 33 projects as an extension from the forward end of the offsetting shoulder 31 and is shaped to engage the inner face of the upper margin of the fender shield panel. Actual interconnection of the head portion 33 of the bracket is effected with the fender shield by interengagement within respective apertures 34 in an upper marginal inturned portion 35 of the fender shield of upstanding retaining lug extensions or fingers 37 on the upper extremity of the head 33. The construction and relationship of the retaining finger extensions 37 is such that they bear against the inner side edges defining the respective lug receiving apertures 34 to thus place the upper portion of the fender shield under the control of the rigid reinforcing and latch bracket member so that when the latch head 20 is drawn up against the margin of the fender defining the wheel access opening, the upper portion of the fender shield is drawn tightly against the outer side of the fender. Through the described interconnection of the upper end portion of the latch bracket with the fender shield panel, any welding or riveting attachment expedients are avoided. Assembly of the latch bracket 25 with the fender shield is easily effected by insertion of the retaining lugs or fingers or extensions 37 through the aperture 34 by an endwise movement and then positioning of the foot flange 29 on the fender shield flange 13 and riveting of the same in place whereby the assembly is completed. In the final assembly, the head portion 33 of the bracket member shoulders against the adjacent inner face of the fender shield panel while the lugs 37 bear firmly against the inner side edges defining the apertures 34 to thereby maintain a firmly rattle proof interengaged relationship of the upper portion of the bracket with the fender shield panel.

For providing a rattle proof, and substantially leak proof engagement of the end and upper margins of the fender shield 10 with the opposing surface areas of the fender 11, a sealing gasket 38 of rubber or rubber-like material is carried by the upper and end edges of the fender shield panel. According to the present invention, the gasket member or strip 38 is carried by a flange 39 on the fender shield panel which is disposed angularly relative to the inturned margin 35 and projects away therefrom as an upward extension along the top of the fender shield and forward extension along the forward end of the fender shield, but preferably as an inward, or underturned forwardly extending flange at the rear end of the fender shield. Such an arrangement of the flange 39 is highly advantageous from a manufacturing standpoint since it requires substantially simpler tooling or die structure than where the flange is underturned throughout the major marginal extent of the fender shield. It is also advantageous for assembly of the gasket strip 38 with the out turned flange extension. Moreover, this arrangement enables effective use of an attached moulding strip 40 for assisting in retaining the gasket strip 38 in place.

The moulding strip 40 may be formed from decoratively suitable material such as stainless steel strip and has upper and lower underturned flanges 41 and 42, respectively, adapted for engagement by more or less conventional metal plate retaining brackets or clips 43 attached by means of screws 44 to the upper margin of the fender shield panel (Fig. 4).

Attachment of the moulding strip 40 is effected upon the upper and forward end marginal extremities of the fender shield panel 10 in such a manner that the upper side portion of the strip concealingly overlies the retaining lugs 37 of the latch bracket as best seen in Figure 3. In addition, the upper margin of the moulding strip 40 is disposed to oppose substantially concealingly the moulding strip 38 which is engaged upon the fender shield marginal flange 39 with opposed leg flanges of the moulding strip gripping respectively the inner and outer sides of the flange 39 and in this instance also to a limited extent overlapping at the extremities of the flange legs the adjacent angularly disposed turned marginal portion 35 of the fender shield panel. Thereby, the turned upper marginal flange 41 of the moulding strip is engageable in clamping, retaining interlocked relation with the outer leg of the gasket strip 38 as best seen in Figures 3 and 4. In addition, the upper margin of the moulding strip substantially concealingly overlies the moulding strip in an attractive, decorative manner.

In the modification of Figure 5, the fender is substantially the same as in Figures 1 and 2 and is accordingly similarly identified, but a slightly modified fender shield 10' is provided wherein the upper inwardly turned reinforcing marginal portion 35' is somewhat more angular so that an almost right angular relationship of the upstanding edge flange extension 39' carrying the sealing gasket strip 38' is afforded. In this form, the decorative moulding strip 40' which is attached to the fender shield by retaining bracket clips 43' secured by screws 44', has its upper marginal underturned flange 41' engaged against the upper edge or tip extremity of the sealing gasket 38' and thereby clampingly retains the sealing strip between the edge of the flange 39' and the upper margin of the moulding strip. This arrangement, moreover, affords a somewhat better concealed relationship of the sealing gasket 38' behind the decorative moulding strip 40'.

In the modification of Figure 6, a slightly modified fender structure 45 has a fender shield 47 assembled therewith and provided with an inturned upper marginal flange 48 having a reinforcing generally out turned extremity flange 49 that carries an overlapping sealing gasket strip 50. A moulding strip 51 has an upper underturned marginal flange 52 that shoulders against the outer leg of the sealing strip 50 in the reentrant groove defined between the fender shield margin 48 and the upstanding flange 49. In this instance, the moulding strip is generally flush at its upper side with the tip of the gasket 50. In other respects, the assembly of Figure 6 should be understood to be substantially the same as the assembly of Figures 2 and 3.

In the modification of Figure 7, details of the fender and fender shield are substantially the same as in Figure 6 and therefore primed reference numerals are used to identify similar parts. In this instance, however, the turned upper marginal flange 52' is engaged against the upper side of the turned fender shield margin 48' directly and abuts the outer shortened leg of the gasket strip 50', with the upper surface of the moulding strip 51' substantially flush with the upper edge of the gasket strip.

It will be understood that modifications and variations may be effected without departing from the scope of the novel concepts of the present invention.

I claim as my invention:

1. In combination in a fender shield construction, a fender shield panel having upper and lower marginal flanges with the lower flange projecting inwardly and the upper flange projecting upwardly away from the fender shield panel, a latch structure on the inner side of the fender shield including a bracket strut member with a head portion including a lug projecting through the upper margin of the fender shield panel to the outer side thereof spaced slightly outwardly from said upper flange, said upper flange having a sealing gasket strip thereon and provided with a leg extending into the space between said upper flange and said lug, and a molding strip secured to the upper margin of the fender shield and having a downturned flange retainingly engaging said sealing gasket strip leg inwardly relative to said lug and the molding strip concealing the lug.

2. In a fender and a fender shield assembly including a vehicle fender having a wheel access opening and a fender shield substantially closing said opening, an upper marginal flange on said fender shield projecting upwardly away from said fender shield, said fender having a portion extending downwardly below said flange, a sealing gasket strip carried over the upper edge of said flange and having a downwardly extending leg on each side of said flange, one of said legs being in sealing relationship with said fender, means coacting between the fender shield and the fender to draw the fender shield, its flange and said leg of said gasket strip against said fender and a molding strip secured to the outer surface of said fender shield and engaging said sealing gasket strip in clamping relationship therewith.

3. In combination in a fender shield construction, a fender shield panel having upper and lower marginal flanges with the lower flange projecting inwardly away from the fender shield panel, a latch structure on the inner side of the fender shield including a bracket strut member with a head portion having a lug projecting through the upper margin of the fender shield panel to the outer side thereof and outwardly of said upper flange, a sealing gasket strip on said upper flange provided with a leg extending between said upper flange and said lug in noise damping relationship to said lug and a molding strip secured to the outer surface of said panel and having an upper portion thereof locking said sealing gasket in position on said flange and at least partially concealing said sealing gasket and said lug.

References Cited in the file of this patent
UNITED STATES PATENTS

| | | |
|---|---|---|
| 1,965,756 | Wondra | July 10, 1934 |
| 2,222,619 | Jandus | Nov. 26, 1940 |
| 2,249,421 | Fergueson | July 15, 1941 |
| 2,336,545 | Jandus | Dec. 14, 1943 |
| 2,353,553 | Fergueson | July 11, 1944 |
| 2,365,792 | Wohlfield | Dec. 26, 1944 |
| 2,577,673 | Bookman | Dec. 4, 1951 |
| 2,621,944 | Schatzman | Dec. 16, 1952 |
| 2,791,464 | Renno | May 7, 1957 |
| 2,856,228 | Adell | Oct. 14, 1958 |